US007131175B2

(12) United States Patent
Young

(10) Patent No.: US 7,131,175 B2
(45) Date of Patent: Nov. 7, 2006

(54) EXTRACTION TOOL FOR EXTRACTING SPIRAL THREADED INSERTS AND USE OF THE EXTRACTION TOOL

(75) Inventor: Graham Cristopher Young, Oberehrendingen (CH)

(73) Assignee: Alstom Technology Ltd., Baden (CH)

( * ) Notice: Subject to any disclaimer, the term of this patent is extended or adjusted under 35 U.S.C. 154(b) by 31 days.

(21) Appl. No.: 10/775,140

(22) Filed: Feb. 11, 2004

(65) Prior Publication Data

US 2004/0159190 A1 Aug. 19, 2004

(30) Foreign Application Priority Data

Feb. 13, 2003 (DE) ................................ 103 05 467

(51) Int. Cl.
*B23P 19/00* (2006.01)
*B23P 19/04* (2006.01)

(52) U.S. Cl. ...................... 29/426.5; 29/240.5; 29/275; 29/402.03; 29/426.1; 29/240; 81/441

(58) Field of Classification Search ............... 29/240.5, 29/227, 240, 275, 426.5, 426.1, 402.03; 81/441
See application file for complete search history.

(56) References Cited

U.S. PATENT DOCUMENTS 2,066,132 A * 12/1936 Zihler ....................... 76/101.1
2,244,824 A * 6/1941 Caminez .................... 29/240.5
2,513,792 A 7/1950 Forster
2,825,750 A * 3/1958 Stockwell .................... 174/87
3,471,160 A * 10/1969 Sabo ............................ 279/7
4,503,737 A * 3/1985 DiGiovanni ................. 81/436
4,553,303 A * 11/1985 Yamamoto ................. 29/240.5
4,635,337 A * 1/1987 Helderman .................. 29/432
4,741,228 A 5/1988 O'Flaherty
4,809,951 A * 3/1989 Klann ....................... 254/10.5
5,309,617 A * 5/1994 Dannar ...................... 29/240.5
6,421,899 B1 * 7/2002 Zitnay ....................... 29/240.5
6,588,305 B1 * 7/2003 Giannakakos et al. ........ 81/441
2004/0187288 A1 * 9/2004 Bruehwiler et al. .......... 29/456

FOREIGN PATENT DOCUMENTS

DE 298 22 289 U1 4/1999
DE 101 23 177 A1 6/2002
EP 1 084 799 A2 3/2001

OTHER PUBLICATIONS

Search Report from DE 103 05 467.7 (Feb. 13, 2003).

* cited by examiner

*Primary Examiner*—Essama Omgba
(74) *Attorney, Agent, or Firm*—Cermak & Kenealy, LLP; Adam J. Cermak

(57) ABSTRACT

An extraction tool (20) for extracting spiral threaded inserts includes an elongated basic body (23, . . . , 26), on the one end of which an extracting tip (28) narrowing toward the front and intended for being inserted with a cutting action into the threaded insert to be extracted is provided, and on the other end of which a device (23) for turning the extraction tool (20) about the tool longitudinal axis is provided. In the case of such an extraction tool, extraction of the threaded inserts through inspection ports is made possible in a simple and reliable manner by virtue of the fact that at least a section of the extracting tip (28) has the shape of a steep-angle truncated pyramid (28.1).

31 Claims, 3 Drawing Sheets

EXTRACTION TOOL FOR EXTRACTING SPIRAL THREADED INSERTS AND USE OF THE EXTRACTION TOOL

BACKGROUND OF THE INVENTION

The present invention relates to the field of mechanical engineering. It relates to an extraction tool for spiral threaded inserts and to the use of such an extraction tool.

PRIOR ART

Large industrial gas turbines require regular inspections of internal plant parts in order to ensure reliable and efficient operation. Access to the internal plant parts is possible through inspection ports which are provided at various locations of the gas turbine and are sealed with sealing plugs. The sealing plugs are screwed into holes, provided with spiral threaded inserts, in the large inner part of the gas turbine. A known system of such spiral threaded inserts is offered on the market by the American company Emhart Teknologies under the trade name "Helicoil®". When the sealing plugs are removed, the threaded inserts are often damaged and therefore have to be replaced. However, the replacement of threaded inserts which are located in the interior of the main casings of gas turbines was only possible with the previous means if the main casings were opened during a main inspection.

SUMMARY OF THE INVENTION

Accordingly, the object of the invention is to provide an extraction tool with which spiral threaded inserts of the Helicoil® type inserts can be extracted or removed through narrow inspection ports in a simple and reliable manner and to specify a use of such an extraction tool.

An aspect of the present invention includes providing, on the extraction tool, an extracting tip in the shape of a steep-angle truncated pyramid which, when the extracting tip is being pressed into the threaded insert, presses with the edges into the threaded insert in a rotationally fixed manner and at the same time fixes it on the extracting tip in a clamping manner, so that it can be unscrewed in a simple manner and, sitting on the extracting tip, can be pulled out through the inspection port.

A preferred configuration of the extraction tool according to the invention is characterized in that the extracting tip has a square cross section, in that the angle of inclination of the faces of the truncated pyramid relative to the perpendicular is only a few degrees, preferably about 1.50°, and in that the extracting tip is made of hardened steel. Due to the square truncated pyramid, with at the same time sharp edges, the pressure of the extracting tip on the threaded insert is uniformly distributed over the periphery. However, it is also conceivable to use a truncated pyramid having a triangular, pentagonal or hexagonal base area.

Since the truncated pyramid of the extracting tip is designed to be very steep, it must be adapted in its outside dimensions relatively accurately to the inside diameter of the respective threaded insert. It is therefore advantageous if the extracting tip is releasably held in the extraction tool so that it can be exchanged. The extracting tip is preferably screwed to the basic body of the extraction tool, a fastening screw being provided for the screwing of the extracting tip, this fastening screw being inserted through the basic body into a thread arranged on the extracting tip and being supported on that end of the basic body which is opposite the extracting tip.

So that a sufficient torque can be transmitted to the extracting tip from outside, it is advantageous if the extracting tip is subdivided into a section in the shape of a truncated pyramid and an adjoining square section, if the extracting tip, with the square section, sits in an insert in a rotationally fixed manner, if the insert, preferably via a hexagonal section, is inserted into the basic body in a rotationally fixed manner, and if the means for turning the extraction tool comprise a hexagonal tubular piece.

So that blows can be exerted on the extraction tool from the rear with a hammer or the like in order to drive the extracting tip into the threaded insert without causing damage to the extraction tool, an impact adapter can be put onto that end of the basic body which is opposite the extracting tip.

A preferred configuration of the method of use according to the invention is characterized in that the extracting tip, by means of blows on the rear end of the extraction tool, is driven into the threaded insert in such a way that the edges of the extracting tip press into the threaded insert virtually over the entire depth to which the extracting tip plunges into the threaded insert.

Further embodiments follow from the dependent claims.

BRIEF DESCRIPTION OF THE DRAWINGS

The invention is explained in more detail below using exemplary embodiments in connection with the accompanying drawings, wherein.

WAYS OF IMPLEMENTING THE INVENTION

Figure 1:
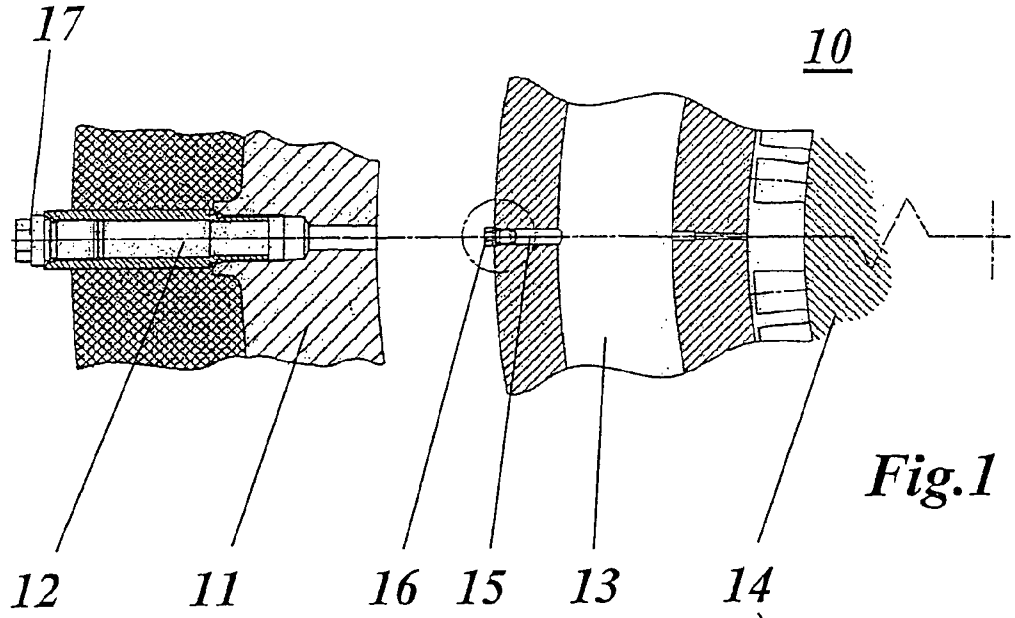
FIG. 1 shows the configuration of a gas turbine in cross section, with inner part and casing and inspection ports, which are closed by sealing plugs.
Figure 2:
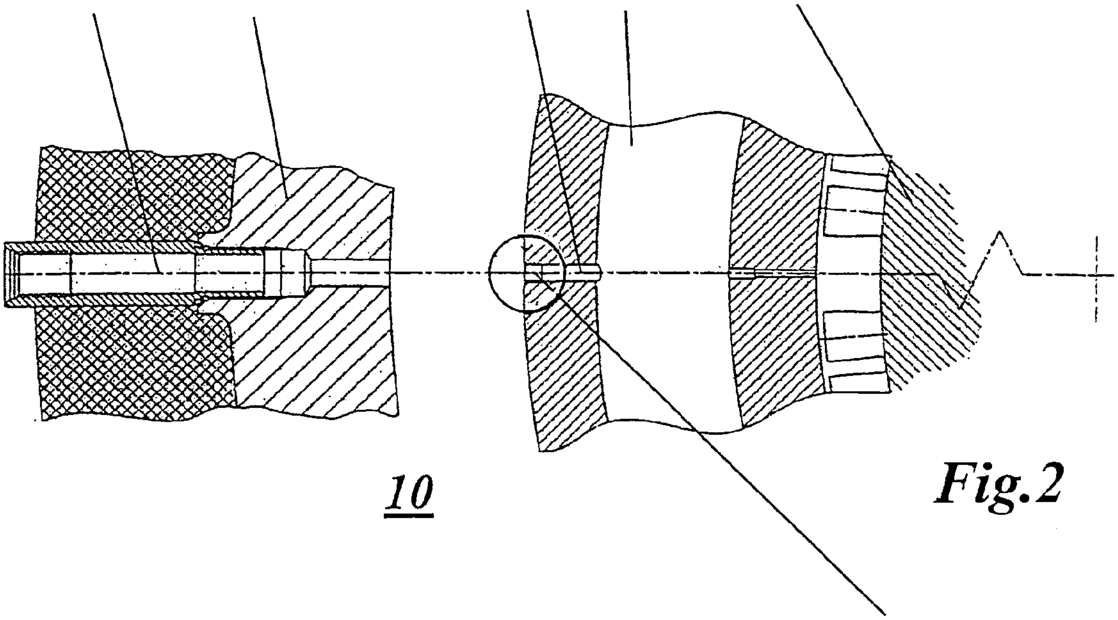
FIG. 2 shows the gas turbine from FIG. 1 with unscrewed sealing plugs.
Figure 3:
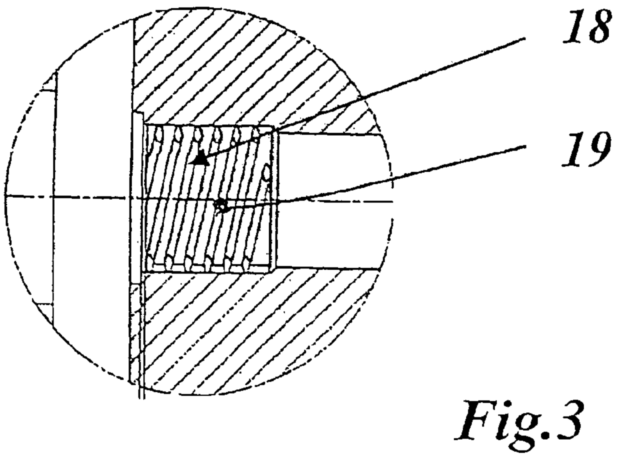
FIG. 3 shows an enlarged detail of the threaded insert in the inspection port in the inner part from FIG. 2.

The configuration of a large turbine, as is suitable in particular as a place of use for the extraction tool according to the invention, is shown in details in FIGS. 1 to 3. The gas turbine 10 comprises an inner part 13 with a rotor 14 inside. The inner part 13 is arranged inside a casing 11. Inspection ports 12 and 15, respectively, which are in alignment with one another and are in the form of through-holes are arranged at various locations in both the casing 11 and the inner part 13, through which inspection ports 12 and 15 components located in the interior of the gas turbine 10, such as turbine blades for example, can be inspected. The inspection ports 12, 15 can be sealed by sealing plugs 16, 17 which can be screwed into corresponding sealing threads at the entrances of the inspection ports 12, 15. A problem in this case is in particular the sealing thread 18 shown in FIGS. 2 and 3 at the entrance of the inspection port 15 arranged in the inner part 13. A spiral threaded insert 19 of Helicoil® type, which has to be exchanged in the event of damage, is inserted (screwed) into this sealing thread 18.

The extraction tool 20 according to the invention is provided for the exchange of such a threaded insert 19 accessible from outside only through the inspection port 12. A preferred exemplary embodiment of such an extraction tool is reproduced in partial longitudinal section in FIG. 4*a*. The extraction tool 20 of FIG. 4*a* has a tubular, elongated basic body which is welded together from a plurality of parts 23, . . . ,26. At the front end (right-hand end in FIG. 4*a*), the basic body has a receptacle 26 which is provided with a hexagon socket and into which the actual extracting tip 28 together with an insert 27 can be releasably inserted and fastened in the inserted state. Formed on the insert is a hexagonal section 31 which matches the hexagon socket of the receptacle 26. In this way, the insert 27 and the extracting tip 28 are connected to the basic body 23, . . . ,26 in a rotationally fixed manner.

The receptacle 26 is welded to the one end of an intermediate piece 25. The other end of the intermediate piece 25 is in turn welded to the one end of a tube 24. Welded to the other end of the tube 24 is a hexagonal tubular piece 23, to which a key can be attached if a torque is to be transmitted to the extracting tip 28 via the basic body 23, . . . ,26.

Figure 4:
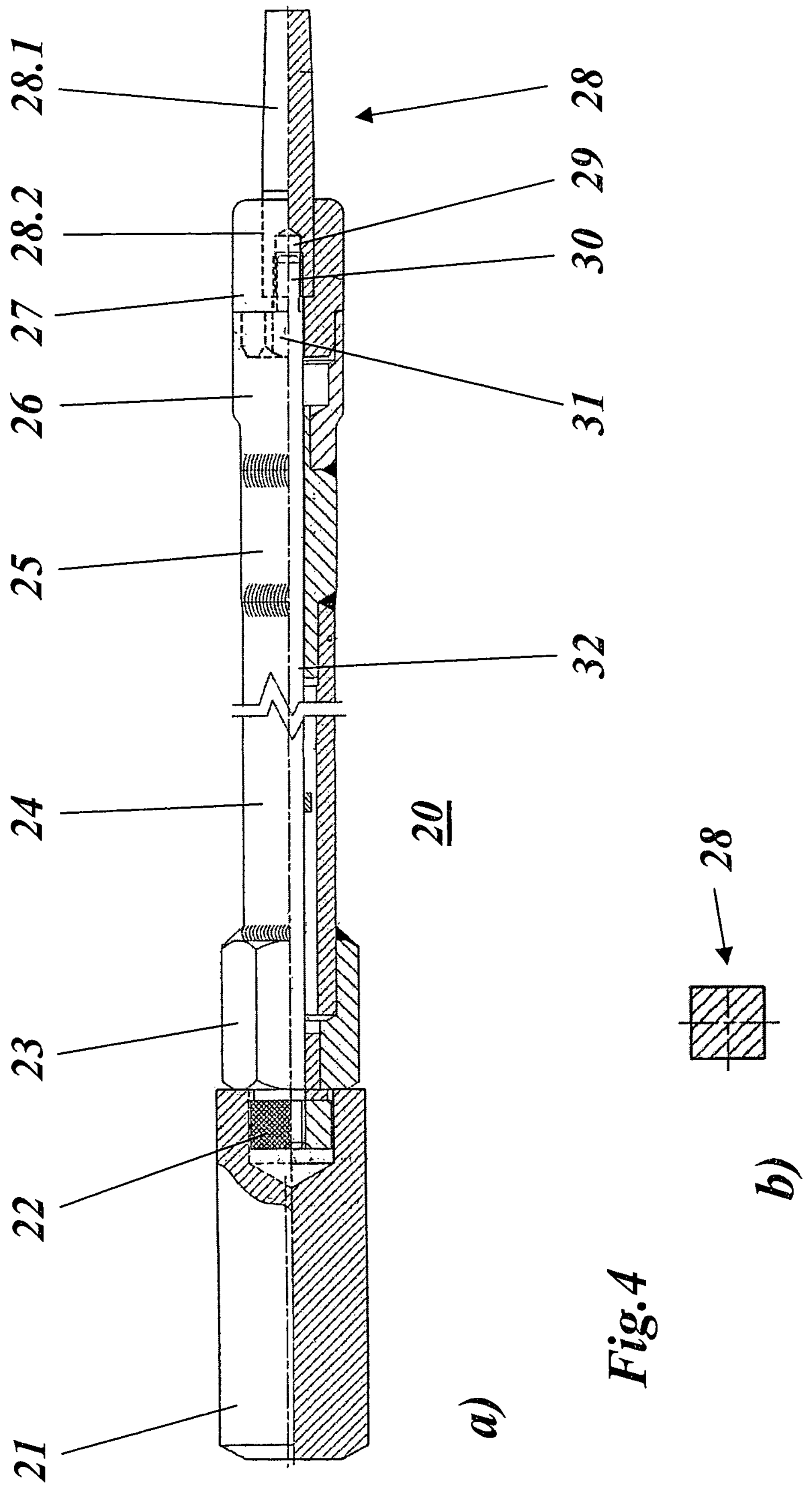
FIG. 4 shows, in two partial figures, the longitudinal section through an extraction tool according to a preferred exemplary embodiment of the invention (partial FIG. 4*a*) and the cross section through the extracting tip of the tool from FIG. 4 (partial FIG. 4*b*)

The extracting tip 28, according to FIG. 4, has a square cross section and is made of a hardened steel. It has two sections over the length, namely a square section 28.2 of constant outside dimensions over the length and an adjoining section in the form of a steep-angle truncated pyramid 28.1, the side faces of which deviate from the perpendicular by only a few degrees, preferably about 1.5°. The extracting tip 28, with the square section 28.2, is rotationally fixed in a corresponding recess in the insert 27. At the rear end, the extracting tip 28 has a tapped blind hole 29, into which a fastening screw 22 put through the hollow basic body 23, . . . ,26 from the rear can be screwed with a threaded section 30 in order to firmly connect the extracting tip 28 and the insert 27 to the basic body 23, . . . ,26. At the other end, the fastening screw 22 is supported with a screw head 22' on the hexagonal tubular piece 23. The fastening screw 22 is guided with its shank 32 in the through-hole of the intermediate piece 25. An elongated circular-cylindrical impact adapter 21, with which axial blows are transmitted to the extraction tool 20 using a hammer or the like, can be slipped loosely over the knurled screw head 22'.

The extraction tool shown in FIG. 4 is very simple but has proved outstandingly successful in the field.

Figure 5:
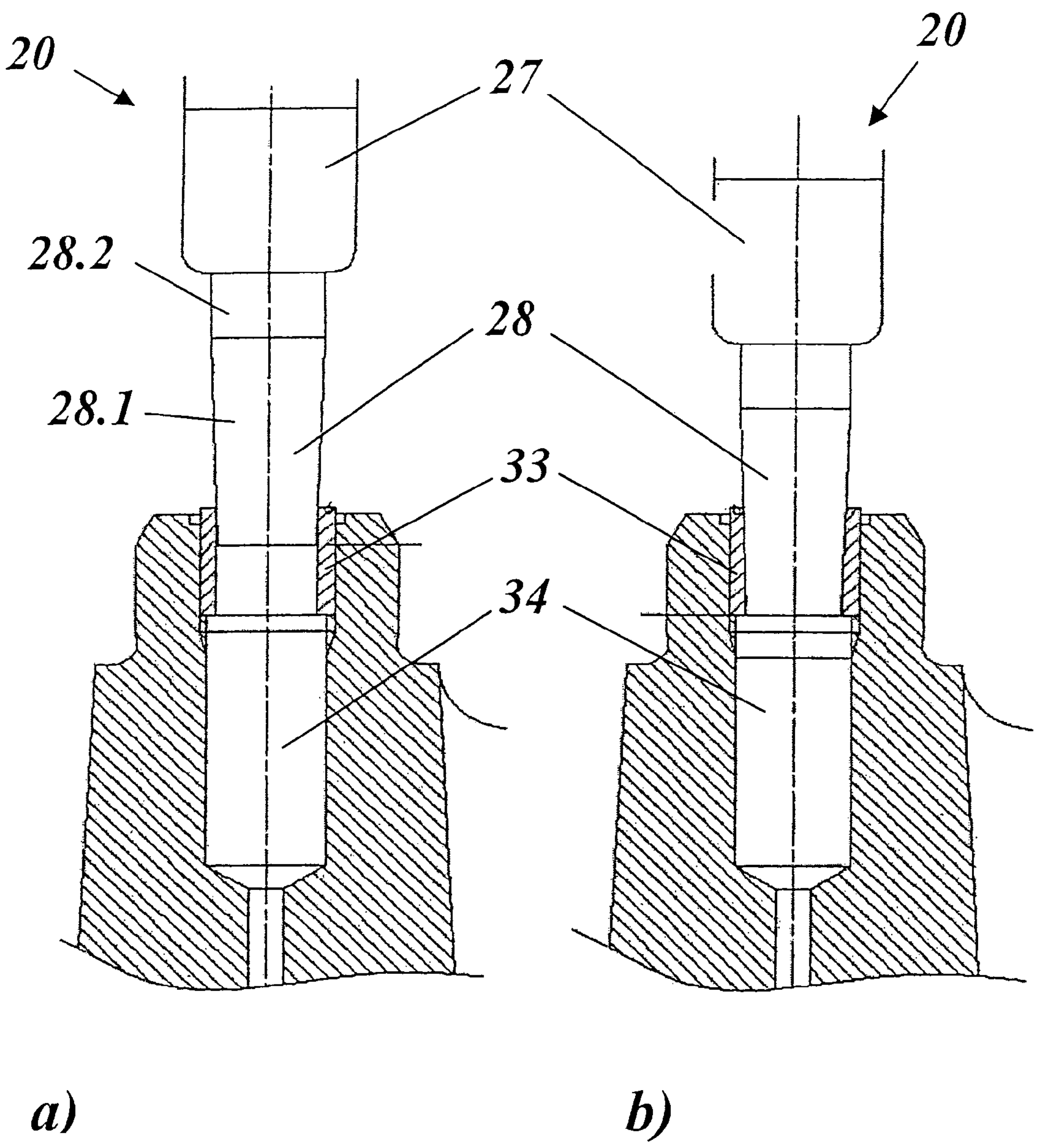
FIG. 5 shows, in two partial figures (FIGS. 5*a, b*), two stages of the press-in operation of the extracting tip of the extraction tool from FIG. 4 in a threaded insert which is to be extracted.

The extraction of a damaged threaded insert from the interior of a gas turbine is carried out as follows according to FIG. 5: the extraction tool 20 is inserted with the extracting tip 28 through the corresponding inspection port into the threaded insert 33 to be exchanged at the entrance of a further inspection port 34 (FIG. 5*a*). With hammer blows on the impact adapter (21 in FIG. 4*a*), the extracting tip 28 is then driven virtually completely into the threaded insert 33 (FIG. 5*b*). In the process, the sharp edges on that part 28.1 of the extracting tip 28 which is in the shape of a truncated pyramid cut into the threaded insert 33, so that the extracting tip 28 sits in the threaded insert 33 in a rotationally fixed manner. If a torque is then applied to the hexagonal tubular piece (23 in FIG. 4*a*) using a key, the threaded insert 33 can be unscrewed. Critical in this case is the angle of inclination of the side faces of the truncated pyramid 28.1. It must be selected to be such a (small) size that the radial forces on the threaded insert 33 are sufficiently small, so that the friction of the threaded insert 33 in its seat is kept to a minimum and the threaded insert 33 can be unscrewed successfully. After the unscrewing, the threaded insert 33 remains sitting on the extracting tip 38 and can be pulled out through the inspection port by means of the extraction tool 20.

Since the extracting tip 28 is interchangeably attached to the extraction tool 20, it can be easily replaced if its edges should have become damaged during use. Exchange is also necessary if threaded inserts 33 of different diameter are to be extracted, since the extracting tip 28, on account of its shape, has to be designed so as to match the respective diameter.

LIST OF DESIGNATIONS

10 Gas turbine
11 Casing
12, 15, 34 Inspection port
13 Inner part
14 Rotor
16, 17 Sealing plugs (screw-in)
18 Sealing thread
19, 33 Threaded inserts
20 Extraction tool
21 Impact adapter
22 Fastening screw
22' Head (fastening screw)
23 Hexagonal tubular piece
24 Tube
25 Intermediate piece
26 Receptacle (hexagon socket)
27 Insert
28 Extracting tip
28.1 Truncated pyramid (section)
28.2 Square section
29 Tapped blind hole
30 Threaded section
31 Hexagonal section
32 Shank

The invention claimed is:

1. An extraction tool for extracting spiral threaded inserts, the extraction tool comprising:
- an elongated basic body having a first end, a second end, and a longitudinal axis;
- an extracting tip on the body first end, the extracting tip having a front end and narrowing toward the front of the extraction tip, the extracting tip for being inserted with a cutting action into the threaded insert to be extracted;
- means for turning the extraction tool about the body longitudinal axis on the body second end;
- wherein at least a section of the extracting tip has the shape of a steep-angle truncated pyramid, such that when the extracting tip plunges into the threaded insert, edges of the extracting tip pyramid will press into the threaded insert and connect the extracting tip to the threaded insert substantially over the entire depth to which the extracting tip plunges into the threaded insert; and
- wherein the extracting tip comprises a true square cross section.

2. The extraction tool as claimed in claim 1, wherein the extracting tip is releasably held in the extraction tool.

3. The extraction tool as claimed in claim 2, wherein the extracting tip is screwed to the body.

4. The extraction tool as claimed in claim 3, further comprising:
- a thread on the extracting tip; and
- a fastening screw for screwing the extracting tip to the body, the fastening screw being inserted though the body into the thread on the extracting tip and being supported on the body first end.

5. The extraction tool as claimed in claim 2, further comprising:

an insert inserted into and rotationally fixed relative to the body;

wherein the extracting tip comprises a section in the shape of a truncated pyramid and an adjoining square section, the extracting tip square section sitting in and rotationally fixed relative to the insert.

6. The extraction tool as claimed in claim 5, wherein the insert comprises a hexagonal section inserted in the body.

7. The extraction tool as claimed in claim 1, wherein the extracting tip is made of hardened steel.

8. The extraction tool as claimed in claim 1, wherein the means for turning the extraction tool comprises a hexagonal tubular piece.

9. The extraction tool as claimed in claim 1, further comprising:

means for receiving an impact adapter in the body second end.

10. The extraction tool as claimed in claim 1, wherein the body comprises a plurality of parts integrally connected to one another.

11. The extraction tool as claimed in claim 10, wherein the parts are welded to one another.

12. A system comprising:

a threaded insert; and an extraction tool as claimed in claim 1 positioned in said threaded insert;

wherein edges of the extracting tip pyramid are pressed into the entire depth of the threaded insert.

13. An extraction tool for extracting spiral threaded inserts, the extraction tool comprising:

an elongated basic body having a first end, a second end, and a longitudinal axis;

an extracting tip on the body first end, the extracting tip having a front end and narrowing toward the front of the extraction tip, the extracting tip for being inserted with a cutting action into the threaded insert to be extracted;

means for turning the extraction tool about the body longitudinal axis on the body second end;

wherein at least a section of the extracting tip has the shape of a steep-angle truncated pyramid;

wherein the extracting tip comprises a true square cross section; and wherein the angle of inclination of the faces of the truncated pyramid relative to the perpendicular is about 1.5°.

14. The extraction tool as claimed in claim 13, wherein the extracting tip is releasably held in the extraction tool.

15. The extraction tool as claimed in claim 14, wherein the extracting tip is screwed to the body.

16. The extraction tool as claimed in claim 15, further comprising:

a thread on the extracting tip; and a fastening screw for screwing the extracting tip, the fastening screw being inserted though the body into the thread on the extracting tip and being supported on that the body first end.

17. The extraction tool as claimed in claim 15, further comprising:

an insert inserted into and rotationally fixed relative to the body;

wherein the extracting tip comprises a section in the shape of a truncated pyramid and an adjoining square section, the extracting tip square section sitting in and rotationally fixed relative to the insert.

18. The extraction tool as claimed in claim 17, wherein the insert comprises a hexagonal section inserted into the body.

19. The extraction tool as claimed in claim 13, wherein the extracting tip is made of hardened steel.

20. The extraction tool as claimed in claim 13, wherein the means for turning the extraction tool comprises a hexagonal tubular piece.

21. The extraction tool as claimed in claim 13, further comprising:

means for receiving an impact adapter in the body second end.

22. The extraction tool as claimed in claim 13, wherein the body comprises a plurality of parts integrally connected to one another.

23. The extraction tool as claimed in claim 22, wherein the parts comprise a receptacle with a hexagon socket, an intermediate piece, a tube, and a hexagonal tubular piece.

24. The extraction tool as claimed in claim 22, wherein the parts are welded to one another.

25. A method of using an extraction tool for extracting a threaded insert, the method comprising:

providing an extraction tool for extracting spiral threaded inserts, the extraction tool comprising an elongated basic body having a first end, a second end, and a longitudinal axis, an extracting tip on the body first end, the extracting tip having a front end and narrowing toward the front of the extraction tip, the extracting tip for being inserted with a cutting action into the threaded insert to be extracted, means for turning the extraction tool about the body longitudinal axis on the body second end, wherein at least a section of the extracting tip has the shape of a steep-angle truncated pyramid, and wherein the extracting tip comprises a true square cross section;

selecting an extracting tip matching an inside diameter of the threaded insert;

inserting the extracting tip into the extraction tool;

inserting the extraction tool with the extracting tip though an inspection port into the threaded insert to be extracted;

driving the extracting tip into the threaded insert by striking the second end of the extraction tool, so that edges of the extracting tip press into the threaded insert and connect the extracting tip to the threaded insert in a rotationally fixed manner, and so that the edges of the extracting tip press into the threaded insert substantially over the entire depth to which the extracting tip plunges into the threaded insert;

unscrewing the threaded insert by turning the extraction tool about a longitudinal axis of the extraction tool; and pulling the threaded insert sitting on the extracting tip though the inspection port.

26. The method as claimed in claim 25, wherein inserting the extraction tool into the inspection port comprises inserting into an inspection port in a casing of a gas turbine.

27. A method of using an extraction tool for extracting a threaded insert, the method comprising:

providing an extraction tool: for extracting spiral threaded inserts, the extraction tool comprising an elongated basic body having a first end, a second end, and a longitudinal axis, an extracting tip on the body first end, the extracting tip having a front end and narrowing toward the front of the extraction tip, the extracting tip for being inserted with a cutting action into the threaded insert to be extracted, means for turning the extraction tool about the body longitudinal axis on the body second end, wherein at least a section of the extracting tip has the shape of a steep-angle truncated pyramid, and wherein the extracting tip comprises a true square cross section;

selecting an extracting tip matching an inside diameter of the threaded insert;

inserting the extracting tip into the extraction tool;

inserting the extraction tool with the extracting tip though an inspection port into the threaded insert to be extracted;

driving the extracting tip into the threaded insert by striking the second end of the extraction tool, so that edges of the extracting tip press into the threaded insert and connect the extracting tip to the threaded insert in a rotationally fixed manner;

unscrewing the threaded insert by turning the extraction tool about a longitudinal axis of the extraction tool; and pulling the threaded insert sitting on the extracting tip though the inspection port;

wherein driving the extracting tip comprises driving into the threaded insert so that the edges of the extracting tip press into the threaded insert over substantially the entire depth to which the extracting tip plunges into the threaded insert.

28. An extraction tool for extracting spiral threaded inserts, the extraction tool comprising:

an elongated basic body having a first end, a second end, and a longitudinal axis;

an extracting tip on the body first end, the extracting tip having a front end and narrowing toward the front of the extraction tip, the extracting tip for being inserted with a cutting action into the threaded insert to be extracted;

means for turning the extraction tool about the body longitudinal axis on the body second end;

wherein at least a section of the extracting tip has the shape of a steep-angle truncated pyramid;

wherein the extracting tip comprises a true square cross section;

wherein the body comprises a plurality of parts integrally connected to one another; and wherein the parts comprise a receptacle with a hexagon socket, an intermediate piece, a tube, and a hexagonal tubular piece.

29. A method of using an extraction tool for extracting a threaded insert, the method comprising:

providing an extraction tool for extracting spiral threaded inserts comprising an elongated basic body having a first end, a second end, and a longitudinal axis, an extracting tip on the body first end, the extracting tip having a front end and narrowing toward the front of the extraction tip, the extracting tip for being inserted with a cutting action into the threaded insert to be extracted, means for turning the extraction tool about the body longitudinal axis on the body second end, wherein at least a section of the extracting tip has the shape of a steep-angle truncated pyramid, and wherein the extracting tip comprises a true square cross section;

selecting an extracting tip matching an inside diameter of the threaded insert;

inserting the extracting tip into the extraction tool;

inserting the extraction tool with the extracting tip though an inspection port into the threaded insert to be extracted;

driving the extracting tip into the threaded insert by striking the second end of the extraction tool, so that edges of the extracting tip press into the threaded insert and connect the extracting tip to the threaded insert in a rotationally fixed manner;

unscrewing the threaded insert by turning the extraction tool about a longitudinal axis of the extraction tool; and pulling the threaded insert sitting on the extracting tip though the inspection port wherein providing an extraction tool comprises providing an extraction tool having an angle of inclination of the faces of the truncated pyramid relative to the perpendicular of about 1.5°.

30. A method of using an extraction tool for extracting a threaded insert, the method comprising:

providing an extraction tool for extracting spiral threaded inserts comprising an elongated basic body having a first end, a second end, and a longitudinal axis, an extracting tip on the body first end, the extracting tip having a front end and narrowing toward the front of the extraction tip, the extracting tip for being inserted with a cutting action into the threaded insert to be extracted, means for turning the extraction tool about the body longitudinal axis on the body second end, wherein at least a section of the extracting tip has the shape of a steep-angle truncated pyramid, and wherein the extracting tip comprises a true square cross section;

selecting an extracting tip matching an inside diameter of the threaded insert;

inserting the extracting tip into the extraction tool;

inserting the extraction tool with the extracting tip though an inspection port into the threaded insert to be extracted;

driving the extracting tip into the threaded insert by striking the second end of the extraction tool, so that edges of the extracting tip press into the threaded insert and connect the extracting tip to the threaded insert in a rotationally fixed manner;

unscrewing the threaded insert by turning the extraction tool about a longitudinal axis of the extraction tool; and pulling the threaded insert sitting on the extracting tip though the inspection port wherein providing an extraction tool comprises providing an extraction tool having an angle of inclination of the faces of the truncated pyramid relative to the perpendicular of about 1.5°;

wherein driving the extracting tip comprises driving into the threaded insert so that the edges of the extracting tip press into the threaded insert over substantially the entire depth to which the extracting tip plunges into the threaded insert.

31. A method of using an extraction tool for extracting a threaded insert, the method comprising:

providing an extraction tool for extracting spiral threaded inserts comprising an elongated basic body having a first end, a second end, and a longitudinal axis, an extracting tip on the body first end, the extracting tip having a front end and narrowing toward the front of the extraction tip, the extracting tip for being inserted with a cutting action into the threaded insert to be extracted, means for turning the extraction tool about the body longitudinal axis on the body second end, wherein at least a section of the extracting tip has the shape of a steep-angle truncated pyramid, and wherein the extracting tip comprises a true square cross section;

selecting an extracting tip matching an inside diameter of the threaded insert;

inserting the extracting tip into the extraction tool;

inserting the extraction tool with the extracting tip though an inspection port into the threaded insert to be extracted;

driving the extracting tip into the threaded insert by striking the second end of the extraction tool, so that edges of the extracting tip press into the threaded insert and connect the extracting tip to the threaded insert in a rotationally fixed manner;

unscrewing the threaded insert by turning the extraction tool about a longitudinal axis of the extraction tool; and pulling the threaded insert sitting on the extracting tip though the inspection port wherein providing an extraction tool comprises providing an extraction tool having an angle of inclination of the faces of the truncated pyramid relative to the perpendicular of about 1.5°;

wherein the inspection port comprises an inspection port in a casing of a gas turbine.

* * * * *